United States Patent [19]
Pinnau et al.

[11] Patent Number: 5,670,051
[45] Date of Patent: Sep. 23, 1997

[54] OLEFIN SEPARATION MEMBRANE AND PROCESS

[75] Inventors: Ingo Pinnau, Palo Alto; Lora G. Toy, San Francisco; Carlos Casillas, San Jose, all of Calif.

[73] Assignee: Membrane Technology and Research, Inc., Menlo Park, Calif.

[21] Appl. No.: 652,837

[22] Filed: May 23, 1996

[51] Int. Cl.$^6$ .................... B01D 61/00; B01D 53/72
[52] U.S. Cl. ............. 210/651; 210/500.27; 210/500.38; 210/638; 95/50; 95/45; 96/4; 96/6; 585/818
[58] Field of Search .................... 210/500.21, 500.27, 210/500.38, 490, 500.36, 651, 640, 638; 95/45, 50, 56; 96/4, 8, 10; 585/818

[56] References Cited

U.S. PATENT DOCUMENTS

| | | | |
|---|---|---|---|
| 3,758,603 | 9/1973 | Steigelmann et al. | 260/677 A |
| 3,758,605 | 9/1973 | Hughes et al. | 260/677 A |
| 3,773,844 | 11/1973 | Perry et al. | 210/640 |
| 3,780,496 | 12/1973 | Ward, III et al. | 96/6 |
| 4,014,665 | 3/1977 | Steigelmann et al. | 210/500.21 |
| 4,047,908 | 9/1977 | Steigelmann et al. | 210/500.21 |
| 4,318,714 | 3/1982 | Kimura et al. | |
| 4,614,524 | 9/1986 | Kraus. | |
| 5,015,268 | 5/1991 | Ho. | |
| 5,062,866 | 11/1991 | Ho. | |
| 5,173,205 | 12/1992 | Marchese et al. | 252/62.2 |
| 5,191,151 | 3/1993 | Ericksen et al. | 95/50 |
| 5,498,339 | 3/1996 | Creusen et al. | 95/50 |

OTHER PUBLICATIONS

K.-V. Peinemann et al., "Preparation and Properties of Highly Selective Inorganic/Organic Blend Memb. for Sep. of Reactive Gases," Proc. of Int. Cong. On Membrane and Membrane Processes, vol. 1, p292, 1990.

*Primary Examiner*—Ana Fortuna
*Attorney, Agent, or Firm*—J. Farrant

[57] ABSTRACT

A membrane and process for separating unsaturated hydrocarbons from fluid mixtures. The membrane and process differ from previously known membranes and processes, in that the feed and permeate streams can both be dry, the membrane need not be water or solvent swollen, and the membrane is characterized by a selectivity for an unsaturated hydrocarbon over a saturated hydrocarbon having the same number of carbon atoms of at least about 20, and a pressure-normalized flux of said unsaturated hydrocarbon of at least about $5\times10^{-6}$ cm$^3$(STP)/cm$^2$·s·cmHg, said flux and selectivity being measured with a gas mixture containing said unsaturated and saturated hydrocarbons, and in a substantially dry environment.

35 Claims, 4 Drawing Sheets

OLEFIN SEPARATION MEMBRANE AND PROCESS

This invention was made in part with support from the U.S. Government under Grant number DE-FG03-93ER81579 from the Department of Energy and under Contract Number DMI-9460087 from the National Science Foundation. The Government has certain rights in this invention.

FIELD OF THE INVENTION

The invention relates to separation membranes. More particularly, the invention relates to facilitated-transport membranes useful for unsaturated hydrocarbon separation from fluid stream, particularly gas streams.

BACKGROUND OF THE INVENTION

Olefins, particularly ethylene and propylene, are important chemical feedstocks. About 17.5 million tons of ethylene and 10 million tons of propylene are produced in the United States annually, mostly as a by-product of petrochemical processing. Before they can be used, the raw olefins must usually be separated from mixtures containing saturated hydrocarbons and other components. Currently, separation of olefin/paraffin mixtures is often carried out by distillation. The low relative volatilities of the components make this process costly and complicated; distillation columns are typically up to 300 feet tall and can contain over 200 trays. The reflux ratios are greater than 10 and the process is, therefore, very energy-intensive. More economical separation processes are needed.

Using a membrane to separate olefins from paraffins is an alternative to distillation that has been considered. Gas-separation membranes are known and are in use in such areas as production of oxygen-enriched air, production of nitrogen for blanketing and other applications, separation of carbon dioxide from methane, hydrogen recovery from various gas mixtures and removal of organic vapors from air. However, because olefins and the corresponding paraffins are similar in molecular size and condensability, their separation with polymeric membranes is difficult, and to our knowledge, no membrane processes with adequate performance have yet been developed.

Facilitated-transport membranes employ a carrier in the membrane that selectively complexes with one of the components of the feed gas. Gas permeation across a facilitated-transport membrane takes place by two mechanisms: normal solution/diffusion of uncomplexed gas molecules, and diffusion of the carrier-gas complex, the second mechanism occurring only for a gas that reacts chemically with the carrier agent. The total transmembrane flux of that gas is the sum of the carrier-gas complex and uncomplexed gas fluxes.

It is well known that certain metal ions, such as silver, can react selectively and reversibly with unsaturated hydrocarbons, so the use of facilitated-transport membranes to achieve the necessary separation properties has been studied, in fact for more than twenty years. Nevertheless, to applicants' knowledge, no facilitated-transport membranes are in industrial use for this, or for any other separation.

The problems that hold back facilitated-transport membranes are instability and low flux. Most facilitated-transport membranes take the form of immobilized liquid membranes (ILMs). These are made by impregnating a microporous membrane with a solution of the facilitating carrier in a solvent, often water. The carrier solution is kept within the pores of the support membrane by capillary forces. Alternatively, the carrier liquid can be sandwiched between supporting membrane layers. ILMs can show extremely high selectivities for the separation of olefins from paraffins under low-pressure laboratory conditions. For example, U.S. Pat. No. 3,758,603, to Steigelmann and Hughes, and U.S. Pat. No. 3,758,605, to Hughes and Steigelmann, report separation factors (selectivities) for ethylene over ethane of as high as 400–700, in conjunction with ethylene fluxes at 10 psig feed pressure of 0.2 ml/cm$^2$.min ($6\times10^{-5}$ cm$^3$/cm$^2$·s·cmHg). These separation properties, if they could be maintained under practical operating conditions, would be more than adequate to meet the performance criteria for industrial applications.

However, it is very hard to keep the carrier solution within the membrane and undegraded for any length of time. The stability of ILMs is very poor; the liquid membrane is driven out of the support by the applied feed pressure, the carrier solute passes into adjacent fluids on the permeate or feed side, or the solvent simply evaporates. The membranes normally have to be made very thick to last even a few hours.

To address these problems, other membrane configurations have been tried. Solid, ion-exchange membranes that exhibit facilitated transport of olefins under humid conditions have been prepared by substituting an appropriate metal counter-ion onto the membrane. For instance, U.S. Pat. No. 4,318,714, to Kimura et al., includes an example in which a glassy, sulfonated polyxylylene ion-exchange membrane is soaked in an aqueous silver nitrate solution, so that the silver ions displace hydrogen as the counter-ion. When tested with pure gas streams humidified to 90% RH, the resulting membranes exhibit pure ethylene permeability of $230\times10^{-9}$ cm$^3$(STP)cm/cm$^2$·s·cmHg and pure ethane permeability of $0.8\times10^{-9}$ cm$^3$(STP)cm/cm$^2$·s·cmHg, yielding a pure gas selectivity of about 300. As with ILMs, these membranes only exhibit facilitated transport, and hence useful separation properties, in a wet environment. The need to keep the membrane wet and/or to humidify the feed and permeate streams is inconvenient and inefficient in a practical process. Furthermore, carrier losses into the aqueous environment can still occur. Also, most commercial ion-exchange membranes are thick, such as 100–500 μm thick or more, so that the olefin fluxes through the membranes would likely be on the low side for a practical process.

In another approach, facilitated transport membranes have been prepared from a glassy, water-soluble polymer, such as polyvinyl alcohol, to which a complexing water-soluble ion or salt, such as silver nitrate, is added. U.S. Pat. Nos. 5,015,268 and 5,062,866, to Ho, describe such membranes. The membranes can be made just a few microns thick, such as 10 μm or 13 μm, and exhibit mixed gas butylene/butane selectivities of 100–200 with butylene permeability of $5\times10^{-8}$ cm$^3$(STP)cm/cm$^2$·s·cmHg, or flux, assuming a 10 μm thick membrane, of about $5\times10^{-5}$ cm$^3$(STP)/cm$^2$·s·cmHg. These properties are obtained, however, by bubbling both the feed gas and the permeate sweep gas through deionized water to humidify them prior to contacting the membrane, a procedure that would be awkward in any other than laboratory conditions. Because the polymers are water-soluble, crosslinking is used to render the membranes more stable.

A similar approach, reported by K.-V. Peinemann et al. ("Preparation and Properties of Highly Selective Inorganic/Organic Blend Membranes for Separation of Reactive Gases", Proceedings of the 1990 International Congress on Membranes and Membrane Processes, Vol. 1, pages 792–794, 1990) is to disperse a silver tetrafluoroborate ion-carrier in poly(perfluoro sulfonic acid) (Nafion®) and amine-modified polyethylene. To increase the mobility of the silver ions in the solid polymer matrix, solvent-swollen membranes were made with ethylene glycol and water. Propylene fluxes of up to $1\times10^{-5}$ cm$^3$/cm$^2\cdot$s$\cdot$cmHg were obtained for these solvent-swollen membranes, again operated with water-saturated feed streams.

Because of the stability and convenience problems associated with maintaining and operating in a water-wet environment, there have been attempts to develop membranes that will function without water. U.S. Pat. No. 4,614,524, to Kraus, describes a facilitated-transport, ion-exchange membrane similar in some aspects to those of Kimura et al., in that an aqueous silver salt solution is used to transfer silver ions into a standard ion-exchange membrane, such as a Nafion® membrane. After preparation, the membrane is allowed to dry, then plasticized by the addition of glycerol or some other polyhydric alcohol. Upon testing with dry ethylene/ethane mixtures, such membranes exhibited selectivity for ethylene over ethane of 10 and ethylene permeability of $7\times10^{-10}$ cm$^3$(STP)cm/cm$^2\cdot$s$\cdot$cmHg. These properties are too poor for the 15 membrane to be industrially useful. Also, membranes that did not contain plasticizer showed no separation properties, and plasticizer may be lost over time.

Thus, to applicants' knowledge, a facilitated-transport membrane that exhibits high olefin/paraffin selectivities, combined with high olefin fluxes, chemical and mechanical stability, and that can be operated in a dry or unswollen state with a dry olefin/paraffin feed is currently not available to the art. Despite much reported research, there remains a real need for such a membrane.

SUMMARY OF THE INVENTION

The invention has three aspects. In one aspect, the invention is a process for separating unsaturated hydrocarbons, including olefins, hydrocarbons with carbon-carbon triple bonds, such as acetylene, and aromatic hydrocarbons, such as benzene, from other components of a fluid mixture. The process involves running the fluid stream to be treated across the feed side of a membrane that is selectively permeable to the unsaturated hydrocarbon component to be separated. The unsaturated component is, therefore, concentrated in the fluid stream permeating the membrane; the residue, non-permeating stream is correspondingly depleted. The process differs from previously known processes, in that:

(i) the feed and permeate streams can both be dry,
(ii) the membrane need not be water or solvent swollen, and
(iii) the membrane exhibits, in a substantially water-dry environment:

(a) a selectivity for ethylene over ethane (or any other unsaturated/saturated hydrocarbon pair having the same number of carbon atoms), as measured with a gas mixture containing both members of the pair, of at least about 20, and (b) an ethylene (or said other unsaturated hydrocarbon) pressure-normalized flux of at least $5\times10^{-6}$ cm$^3$(STP)/cm$^2\cdot$s$\cdot$cmHg.

To achieve a high flux of the permeating components, the membrane should be thin. A preferred embodiment of the invention involves the use of a composite membrane comprising a microporous support, onto which the selective layer of separating material is deposited as a thin coating. The preparation of such membranes is known in the art, and is discussed in detail below.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention.

The membrane separation process may be configured in many possible ways, and may include a single membrane unit or an array of two or more units in series or cascade arrangements. Eighty to 99% or above removal of the target unsaturated hydrocarbon content of the feed to the membrane system can typically be achieved with an appropriately designed membrane separation process.

The process is believed to be particularly useful in separating unsaturated hydrocarbon gases or vapors from other gases or vapors. The process is especially useful for separating unsaturated hydrocarbons from their saturated counterparts, such as ethylene from ethane, propylene from propane or butylene from butane. The process may also be used for separating liquid mixtures containing an unsaturated hydrocarbon. The concentration of the unsaturated hydrocarbon in the feed stream may be any value.

In the second aspect, the invention is a membrane for carrying out separations of unsaturated hydrocarbons from other components in a mixture. The membrane has characteristics and properties that are different from those of the membranes previously used for this type of separation. The membrane is a facilitated-transport membrane, containing a carrier complex, usually in the form of an ionic metal salt, dissolved not in water or other liquid, but in a solid polymer. Because the carrier is dissolved in the polymer, rather than simply mixed or dispersed, the carrier is dissociated into ions and is believed to be mobile within the polymer material. Unlike previous membranes and processes, the polymer is preferably an amorphous rubber, can be water-insoluble, and does not require cross-linking for stability. The membrane does not need water or any swelling agent to render the carrier active. Also unlike previous membranes, the membrane may be loaded with very high concentration of the carrier complex, to enhance the facilitation properties, while maintaining excellent mechanical properties.

In a third aspect, the invention is the solid polymer solution itself.

It is to be understood that the above summary and the following detailed description are intended to explain and illustrate the invention without restricting its scope.

DETAILED DESCRIPTION OF THE INVENTION

Figure 1:
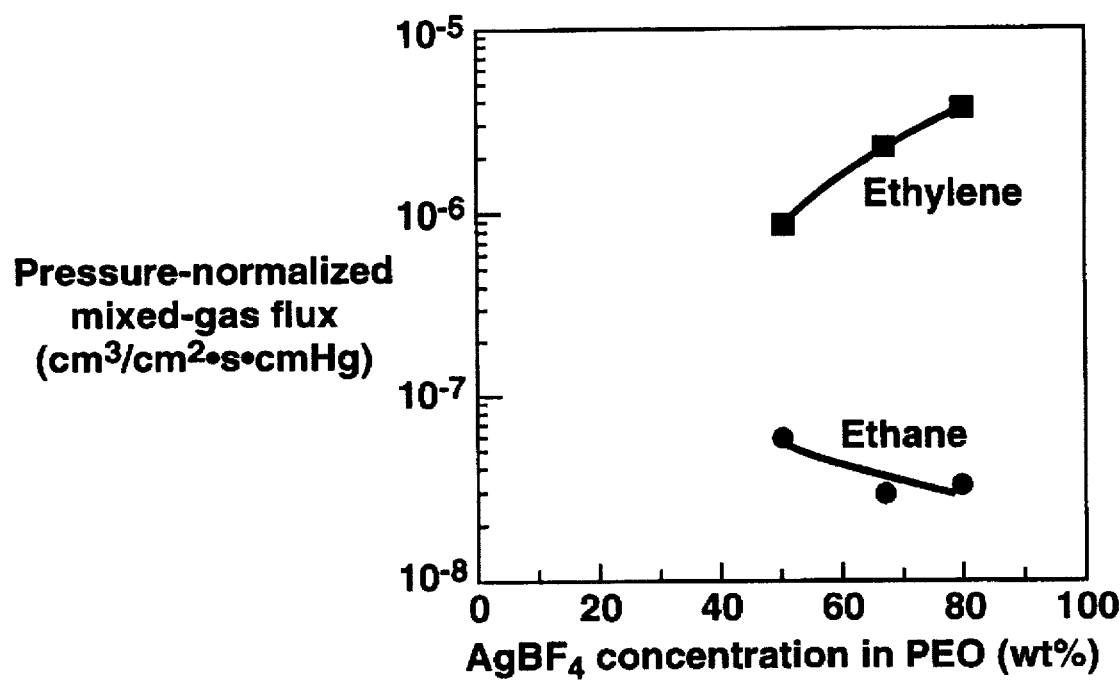
FIG. 1 is a graph of pressure-normalized mixed gas ethylene and ethane fluxes as a function of salt concentration in the solid polymer solution.

The term fluid as used herein means gas, vapor or liquid.
The term gas as used herein means gas or vapor.
The term unsaturated hydrocarbon means a compound comprised of carbon and hydrogen with at least one carbon-carbon double bond or one carbon-carbon triple bond.

The term olefin means a member of the family of unsaturated hydrocarbons with a carbon-carbon double bond of the series $C_nH_{2n}$.

The term paraffin means a member of the family of saturated aliphatic hydrocarbons of the series $C_nH_{2n+2}$.

The scope of the invention is not intended to be limited to any particular streams, but to cover any situation where a stream containing an unsaturated hydrocarbon is to be separated. The composition of the stream may vary widely, from a mixture that contains the unsaturated hydrocarbon in the ppm range or below, to streams that contain the unsaturated hydrocarbon as the major component.

The invention is expected to be particularly useful in separating streams containing mixtures of low molecular weight olefins and paraffins, such as separating ethylene from ethane, propylene from propane, or butylene from n-butane or iso-butane. Other possible applications include separation of aromatic compounds from saturated hydrocarbons, such as benzene from cyclohexane.

At the moment, we believe that the invention will be most useful for gas separation, and for simplicity, the general description above and the detailed description that follows focus on the invention as it pertains to gases and vapors. However, the invention is also useful for, and includes, separation of unsaturated hydrocarbons from liquid mixtures.

In the process of the present invention, a feedstream containing an unsaturated hydrocarbon gas, vapor or liquid is passed across a thin, selective membrane. The membrane forms a barrier that is relatively permeable to the unsaturated hydrocarbon component of the stream, but relatively impermeable to other components.

The process differs from processes previously reported in the literature in the nature of the membranes that are used. The membranes are facilitated-transport membranes that contain a carrier complex in a polymeric matrix. However, the carrier complex is not supported in the pores or on the surface of a support membrane, as in immobilized liquid membranes. Neither is the carrier tightly bound to the polymer matrix, as is the case with modified ion-exchange membranes, or dispersed as a discrete second phase within the polymer phase, as in fixed-site carrier membranes. Instead, the carrier is dissolved in the polymer matrix, to form a solid solution. Solid polymer solutions of various types have been prepared before, such as to create ion-conducting polymers, also known as solid polymer electrolytes. When electrodes are attached, a current can be made to flow in the polymer. Small shapes or films cast from this type of material have been suggested, therefore, for use in batteries or other electrochemical devices. U.S. Pat. No. 5,173,205, for example, to Marchese et al., describes preparation and testing of solid polymer electrolytes.

Unexpectedly, we have found that solid solutions and in particular solid polymer electrolytes can be prepared in which the carrier ions appear to have a high level of mobility without the application of an electric field, making them potentially useful as facilitated-transport membranes. Even more unexpectedly, we have found that, unlike previous facilitated-transport membranes and processes applicable to unsaturated hydrocarbon separations, the polymer matrix can be rubbery, amorphous, water-insoluble and non-crosslinked, and the membrane does not need water or any swelling agent to render the carrier active. Also unlike previous membranes, the membrane may be loaded with very high concentrations of the carrier complex, to enhance the facilitation properties.

The membranes comprise a polymer matrix as solvent and a material capable of reversibly complexing with unsaturated hydrocarbons as facilitated transport carrier and solute. The nature of both solute and solvent has an effect on the membrane performance. The solute is usually in the form of an ionic metal salt, consisting of a metal cation and a salt anion. In the environment of a solid polymer solution, the metal cations can interact in at least three ways: with the salt anions, with anions or donated electrons present in the polymer structure, and with electrons from the unsaturated bonds of the hydrocarbon.

The relative strength of these potential interactions is important. The process of the invention uses membranes in which the relationship between the bond strengths is controlled by appropriate selection of metals, salts and polymers.

The material chosen for the polymer that forms the solvent for the carrier complex should (a) promote dissolution of the metal salt into the polymer matrix, and (b) provide high mobility for complexed unsaturated hydrocarbon molecules.

With regard to point (a), polar groups are common in polymers; thus many polymers might be expected to behave as high-molecular-weight solvents. However, not all polymers that contain such groups are suitable for forming solid solutions and solid polymer electrolytes useful in the invention. A salt will dissolve in a solvent only if dissolution produces an overall reduction in free energy of the system. Factors that contribute to the final energy state of the system include: the specifics of the bond between the metal ion and the polymer (whether the bond is an electrostatic bond between the metal ion and a negatively charged group on the polymer, or a coordination bond achieved by the sharing of electrons from the polymer group); Lewis acid-base interactions between the coordinating sites on the polymer and the ions; the strength of long-range electrostatic interactions between metal and salt ions; the distance apart of the coordinating groups if the bond is a metal-polymer coordination bond; and the polymer's ability to adopt conformations that allow multiple inter- and intramolecular coordination.

Based on the above factors, our preferred polymers are those that can form coordination (electron-sharing) bonds with the metal ion by means of an oxygen, nitrogen or sulfur electron-donating atom, known as a heteroatom, in the polymer structure.

Just as the nature and strength of the interaction between the metal ions and the polymer, and the net effect on free energy, should promote dissociation of the metal salt if a solution is to be formed, so the nature and strength of the interaction between the metal ion and the unsaturated hydrocarbon, and the net effect on free energy, should promote breaking of the interaction between the metal and polymer, if a metal-hydrocarbon complex is to be formed. To achieve this, the preferred solid solution is a solid polymer electrolyte, that is, a salt dissolved in a solvating polymer through interaction of the metal ion and polymer as defined above.

With regard to point (b), the polymer chains should exhibit low barriers to bond rotation, to provide sufficient segmental mobility of the polymer chains that the metal ions can be transferred from chain to chain as the polymer undergoes thermal motions. Therefore, polymers that form a predominantly amorphous, rather than crystalline, matrix at the temperature under which they are to be used (typically 25° C.) are preferred, as are those that have flexible backbones, such as rubbers, at normal operating temperatures.

Another category of useful polymers is those that, although normally of crystalline or semi-crystalline structure under the relevant operating conditions, can form amorphous solutions with metal salts. Yet another category of useful polymers is those that, although normally of crystalline or semi-crystalline structure under the relevant operating conditions, can form copolymers with, for example, rubbers, so that the resulting copolymers have a substantially amorphous and flexible nature. Normally crystalline materials may also be discouraged from forming a rigid or crystalline structure by adding side branches, by crosslinking or by blending with impurities.

Thus, the polymer may take the form of a homopolymer, a copolymer, a block copolymer, or a mixture or blend, with any kind of chain structure that provides sufficient flexibility for good carrier mobility. Polymers that have a high degree of chain regularity are more likely to be crystalline than polymers that do not, and are therefore less preferred for use in the invention.

It is most preferred that the ionic motion takes place as in solid polymer electrolytes, without long-range displacement of the polymer solvent. In this case, local relaxation processes in the polymer chains provides liquid-like degrees of freedom, giving the polymer properties similar to those of a molecular liquid.

The most preferred polymers for use in the invention, therefore, combine the ability to solvate the metal salt by forming coordination bonds with the metal ion and the ability to provide a sufficiently amorphous and flexible environment that permeants can move through the polymer with degrees of freedom approaching those of a molecular liquid. Among these, polymers incorporating an ether (R—O—R) linkage, where the oxygen atom can serve as the electron-donating heteroatom, are especially preferred. Such polymers include numerous polymers having alkyl oxide repeating units, including the polyalkyl oxides, such as poly(ethylene oxide), poly(propylene oxide) and so on, many of which are readily available commercially. Grades that form tight, stiff structures should be avoided. For example, poly(methylene oxide), (—CH$_2$O—)$_n$, has a tight, helical structure and forms a rigid material that is unsuitable in the context of the invention. Polymers containing multiple methyl groups in the repeating unit, such as poly(tetramethylene oxide), (—CH$_2$CH$_2$CH$_2$CH$_2$O—)$_n$, tend to have a softer, planar structure and can be used.

The alkyl oxide containing polymers may take the form of copolymers with other monomers or polymers. Forming copolymers with rubbery materials, such as silicone rubber, may decrease any tendency to crystallize, and improve backbone flexibility and transport properties.

Other specific examples of polymers containing ether linkages that we have found to be useful are poly(epichlorohydrin) (PE), epichlorohydrin/ethylene oxide copolymer (PE/EO), and propylene oxide/allylglycidylether copolymer (PO/AGE). Our most preferred polymer is PO/AGE copolymer.

Yet other suitable polymers containing ether linkages are polyether-polyamide block copolymers having the general formula:

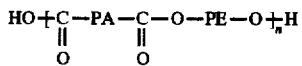

where PA is a saturated aliphatic polyamide segment, PE is a polyether segment, and n is the number of repeat units.

Polyesters, such as polyalkyl adipates, succinates, sebacates and so on, are also preferred materials that contain an oxygen donor atom.

It will be appreciated by those of skill in the art that not all specific polymer/metal/salt combinations between the materials suggested herein will provide desirable separation properties and that some modest level of experimentation within the general guidelines and teachings set forth above and below may be necessary to select the optimum polymer for use with any particular metal cation/salt anion combination.

Turning now to the selection of components for the ionic metal salt, these should be compatible with the dissolution criteria discussed above, yet the metal should form sufficiently labile bonds with the polymer to promote metal ion/unsaturated hydrocarbon complexing and metal ion/unsaturated hydrocarbon complex mobility.

As a general chemical principle, there is a tendency for preferential reactions between hard acids/hard bases and soft acids/soft bases. Hard acid/hard base compounds are, in general, more tightly bound and, therefore, more difficult to dissociate than soft acid/soft base compounds. By a soft acid, we mean a positive ion having low electronegativity and high polarizability, combined with a relatively large ionic radius and/or looseness of valence electrons. Such ions are preferred for the metal ion. To express these preferences quantitatively, the preferred metal ions are those that have an ionic radius greater than about 0.07 nm, combined with a positive (>0) softness parameter, $\sigma_M$, where $\sigma_M$ is defined as the difference between the ionization potential of the gaseous atom to form the cation and the enthalpy of hydration of the cation (normalized by subtraction of and division by the corresponding difference for the hydrogen ion).

Representative soft metal ions preferred for use in the invention include, but are not limited to, those listed in Table 1.

TABLE 1

| Cation | Ionic radius (nm) | Softness parameter |
|---|---|---|
| Cu$^+$ | 0.096 | +0.26 |
| Ag$^+$ | 0.126 | +0.18 |
| Au$^+$ | >0.07 | +0.45 |
| Cd$^{2+}$ | 0.097 | +0.59 |
| Hg$^{+ \text{ or } 2+}$ | 0.110 (2+) | +1.28 (2+) |
| Bi$^{3+}$ | 0.102 | +0.61 |
| Tl$^{3+}$ | 0.095 | +0.92 |
| Sn$^{2+}$ | 0.093 | +0.31 |
| Pb$^{2+}$ | 0.132 | +0.58 |

Those of skill in the art will appreciate that other suitable positive ions may be found by measurement of the ionic radius and softness parameter of any candidate material. The most preferred materials for forming the positive ions are those that combine easy availability and handling, moderate cost, and proven or expected good unsaturated hydrocarbon complexation. Most preferred are silver and copper.

By the same reasoning as above, the salt anion is preferably a soft base, which forms a relatively easily dissociated complex with the metal ion, to promote dissolution of the salt in the polymer matrix. By a soft base, we mean a base having low electronegativity and high polarizability, combined with a relatively large ionic radius and/or looseness of valence electrons. To express these preferences quantitatively, the preferred anions are those that have an ionic radius greater than about 0.15 nm, combined with a positive softness parameter, $\sigma_M$, greater than about +0.2, where $\sigma_M$ is defined as the difference between the electron affinity of the gaseous atom or radical forming the anion and the enthalpy of hydration of the anion (normalized by subtraction of the corresponding difference for the hydroxide ion and division by the difference between the ionization potential of the hydrogen atom and the enthalpy of hydration of the hydrogen ion).

Representative preferred soft anions include, but are not limited to, those listed in Table 2.

TABLE 1

| Anion | Ionic radius (nm) | Softness parameter |
|---|---|---|
| I$^-$ | 0.216 | +0.40 |
| SH$^-$ | 0.195 | +0.63 |
| CN$^-$ | 0.191 | +0.48 |
| SCN$^-$ | 0.213 | +0.84 |
| N$_3^-$ | 0.195 | +0.78 |
| BF$_4^-$ | 0.232 | +ve |
| B(C$_6$H$_5$)$_4^-$ | 0.421 | +6.86 |
| S$^{2-}$ | 0.184 | +1.02 |

Those of skill in the art will appreciate that other suitable anions may be found by measurement of the ionic radius and softness parameter of any candidate material.

If the softness parameter for any material of interest is not available, it is also possible to make an approximate determination of hardness or softness for any given base by its apparent preference for other hard or soft reagents whose softness parameters are known. For example, a base B may be categorized by its behavior in a reversible reaction such as the following:

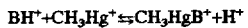

$$BH^+ + CH_3Hg^+ \rightleftarrows CH_3HgB^+ + H^+$$

Since there is a general preference for complexes to be formed between hard acids and hard bases and between soft acids and soft bases, a hard base will cause the reaction to go to the left, but a soft base will cause it to go to the right. This same methodology may be used to determine the approximate softness of an unknown acid by its preference between known hard and soft Based on ready availability and handling, moderate cost, and proven or predicted good experimental results, the most preferred anions are cyanide (CN$^-$), thiocyanide (SCN$^-$), tetrafluoroborate (BF$_4^-$), and tetraphenylborate (B(C$_6$H$_5$)$_4^-$).

Most previously studied facilitated-transport membranes, such as those of Hughes, Steigelmann and Ho, have used nitrate as the salt anion for the carrier complex. However, the nitrate ion has a softness parameter of −0.41 and a relatively small size (ionic radius 0.189 nm). Thus the nitrate ion is a hard base and nitrate salts are unsuitable for use in our invention. We have verified by experiment that nitrate salts do not meet our performance definitions for the membrane. Other anions with negative softness parameters that are unsuitable include fluoride (F$^-$), chloride (Cl$^-$), carbonate (CO$_3^{2-}$), and sulfate (SO$_4^{2-}$).

To achieve a high flux of the permeating components, the separation membrane manufactured using the materials discussed above should be thin, and most preferably very thin, such 5 μm or less thick, or even less, such as no more than about 2 μm thick or even no more than about 1 μm thick. The membrane may be in any convenient form, ranging from and including, for example, a single layer film to multilayer laminates in which the separation membrane forms one or more layers of the total structure.

Applicants prefer to use composite membranes in which the separation membrane is supported as a selective layer on a microporous, high-flux, relatively unselective substrate. The microporous substrate should have a flow resistance that is very small compared to the selective, separating membrane layer. A preferred support substrate is an asymmetric Loeb-Sourirajan type membrane, which consists of a relatively open, porous substrate with a thin, dense, finely porous skin layer. The support substrate should resist the solvents that will be used in applying the selective layer. Suitable supports may be made by the processes for making finely porous isotropic or asymmetric membranes known in the art. The thickness of the support layer is not critical, since its permeability is high compared to that of the selective layer. However the thickness would typically be in the range 100 to 500 microns, with about 150 microns being a representative preferred value.

Optionally, the support substrate may itself be reinforced by casting it on a fabric web. The multilayer membrane then comprises the web, the microporous substrate layer and the selective, separating layer.

The selective layer in the form of a solid polymer solution is most conveniently prepared from a liquid pre-solution that contains both the polymer matrix and the metal salt materials. The pre-solution may be prepared in one step or by preparing individual solutions of polymer and salt and then mixing them. Any suitable solvent or compatible solvents may be used, such as C$_1$–C$_4$ alcohols, other oxygen-containing solvents or acetonitrile. If a water-soluble polymer is chosen, water is a convenient solvent for both salt and polymer.

We have found that stable solid solutions can be prepared using very high carrier concentrations compared with previous types of facilitated-transport membranes. This is advantageous, because the higher the carrier concentration, the greater the flux contribution from the facilitated-transport mechanism. We obtained excellent unsaturated hydrocarbon fluxes and selectivities, without compromising membrane integrity or stability, at salt loadings up to 80 wt % or even above. The preferred loadings of metal salt solute in the solid polymer solvent are thus high, such as above 30 wt %, more preferably above 50 wt %, and most preferably as high as can be obtained as a stable solution for the specific combination of polymer and salt being used, such as 60 wt %, 70 wt %, 80 wt %, 90 wt % or even higher.

When the liquid pre-solution containing the polymer matrix material and the ionic salt has been prepared, the preferred method of depositing the selective layer on the microporous substrate is by dip-coating. The dip-coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. After evaporation of the coating solvent, a thin selective layer is left on the support. If the dip-coating method is used, the solvent or solvents used to prepare the coating solution should not attack the support membrane.

Alternatively, the selective layer can be cast independently and then brought into contact with the supporting substrate.

Optionally, sealing, protective or gutter layers may be added above or below the selective layer as desired. Multiple selective layers, either contiguous or not, and of like or unlike composition, may also be used.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention.

Membranes prepared in accordance with the teachings above are found to exhibit novel and useful gas-separation properties. In particular, the metal ions form mobile, reversible complexes with unsaturated hydrocarbons, even in the absence of water and/or membrane-swelling agents. Thus, even in a dry environment, the membranes can provide sufficiently good flux and selectivity to be industrially useful. To applicants' knowledge, this is the first time that such membranes have been available to the art. Specifically, the membranes are characterized by a selectivity for an unsaturated hydrocarbon over a saturated hydrocarbon having the same number of carbon atoms of at least about 20, and a pressure-normalized flux (that is, a flux per unit transmembrane pressure difference) of said unsaturated hydrocarbon of at least about $5 \times 10^{-6}$ cm$^3$(STP)/ cm$^2 \cdot$s$\cdot$cmHg, said flux and selectivity being measured with a gas mixture containing said unsaturated and saturated hydrocarbons, and in a substantially dry environment. It is simple and convenient to use ethylene and ethane as the reference unsaturated and saturated hydrocarbons, but the membranes and processes of the invention satisfy our definition so long as the specified flux and selectivity are attainable with any hydrocarbon pair. Likewise, the pressure and temperature values under which the defining combination of selectivity and flux are obtained may be any values, but are conveniently room temperature, such as 20° C. or 25° C., and transmembrane pressure difference of 50 psig, such as feed pressure of 50 psig and permeate pressure of 0 psig. These separation properties provide a limiting definition of the membranes themselves that distinguishes them over prior art membranes, which could not achieve these performance properties.

Although the membranes are defined by these specific flux and selectivity values, higher values for both may frequently be obtained in practice, as shown by the examples below. For example, actual selectivities as high as 40, 50, 60, 100 or even higher may be reached, as may unsaturated hydrocarbon pressure-normalized fluxes as high as $1 \times 10^{-5}$ cm$^3$(STP)/cm$^2 \cdot$s$\cdot$cmHg, $5 \times 10^{-5}$ cm$^3$(STP)/cm$^2 \cdot$s$\cdot$cmHg, or even higher.

Also, although the membranes of the invention are defined by their dry gas-separation performance, this does not mean that the processes of the invention necessitate a dry environment. Unless it is convenient to do so for other reasons, it is not normally necessary to either remove water from or add water to an incoming feed stream prior to membrane treatment. Likewise, although the membranes of the invention are themselves defined in terms of their ethylene/ethane separation capability, the processes of the invention are not limited to such separations.

In the gas-separation aspect, the process of the invention involves running a gas stream containing an unsaturated hydrocarbon gas or vapor across the feed side of a membrane such as those described above. A permeate stream enriched in the unsaturated hydrocarbon component to be separated is withdrawn from the permeate side, and a residue stream depleted in unsaturated hydrocarbon content is withdrawn from the feed side. A pressure difference between the feed and permeate sides of the membrane provides a driving force for the process. The pressure difference may be provided by compressing the feed gas, drawing a vacuum on the permeate side of the membrane, or a combination of both. Sometimes, the feed stream to be treated may already be at a sufficiently high pressure that the separation can be carried out without any additional driving force.

One of the problems that has prevented the commercialization of previously known facilitated-transport membranes is their poor pressure stability. A relatively small pressure difference across the membrane, such as 50 psig or less, can contribute to loss of the carrier over a very short time, such as a few hours or days. Since our membranes have a solid polymer matrix, we have found that they have a pressure stability similar to that of conventional polymer membranes used in gas separations. We have established that, if needed, the membranes can be operated at feed pressures up to 100 psig, 200 psig, 500 psig or higher without loss of carrier ions.

The transport mechanism across the membrane is a combination of uncomplexed solution/diffusion and complex formation/diffusion. As far as the uncomplexed solution/diffusion is concerned, the normal Fick's Law relationship applies; that is the transmembrane flux of a component is directly proportional to the partial pressure difference for that component across the membrane and the greater the partial pressure difference, the higher the flux. Of course, in a practical situation, raising the feed-side partial pressure almost always means raising the feed-side total pressure, which has the effect of proportionately increasing the flux of all components of the feed stream, not just those that it is desired to permeate.

As far as complex formation and diffusion mechanism is concerned, increasing the feed partial pressure of the complex-forming components increases their sorption rate into the membrane. When sorption is fast enough to maintain carrier saturation, that is all the carrier ions on the feed side are in the complexed state, any further increase in unsaturated hydrocarbon partial pressure does not increase the complexed unsaturated hydrocarbon flux, because the carrier is already fully utilized. Very high partial pressure differences will not normally be required to operate the process successfully, therefore. It is expected that the total pressure difference across the membranes will normally be no more than about 300 psig, and often less, such as no more than about 100 psig or 50 psig.

If the feed pressure is above atmospheric, adequate driving force may be provided by maintaining the permeate side of the membrane at atmospheric pressure. If required, subatmospheric pressures, down to any degree of vacuum, may be provided on the permeate side to create or enhance the driving force. It is also possible to operate with a sweep stream, such as an inert gas or liquid, on the permeate side.

Figure 4:
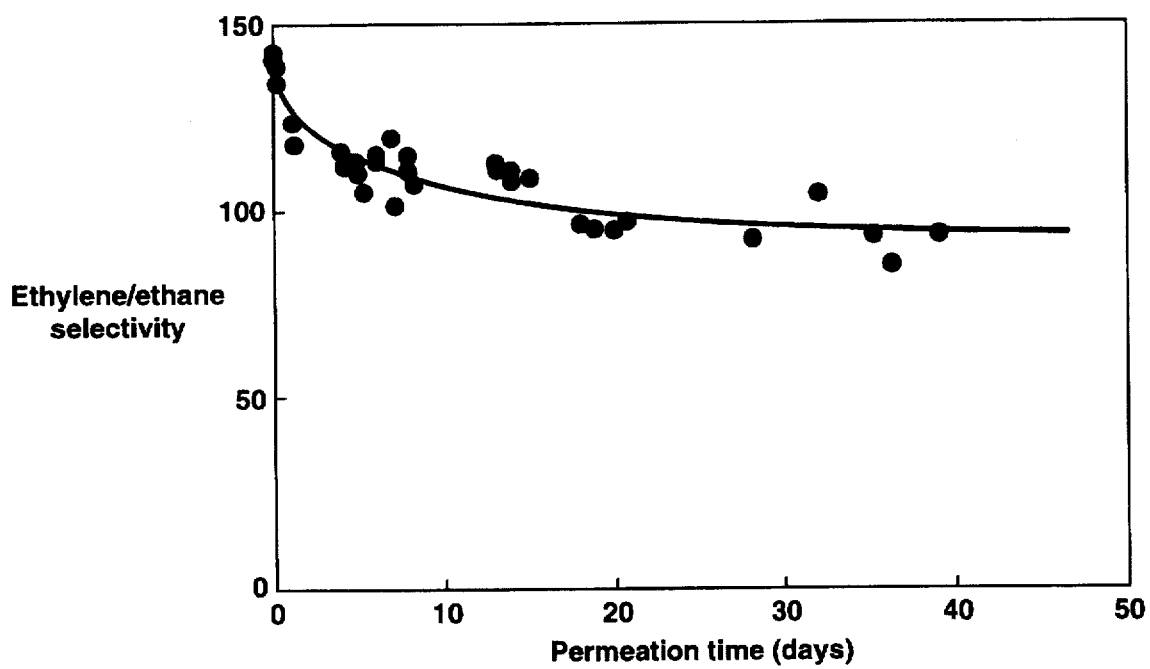
FIG. 4 is a graph of mixed gas ethylene/ethane selectivity over a 40-day test period.

A single-stage membrane unit is generally able to remove 80%, 90% or more of the unsaturated hydrocarbon from the feed, depending on the membrane characteristics and operating conditions. If this is inadequate, a two-step or multistep process, in a series arrangement where the residue from the first unit forms the feed to the second, may be used. If each unit can remove 90% of the feed gas reaching it, for example, then a two-step arrangement will remove 99% of the unsaturated hydrocarbon content of the raw gas, a three-step will remove 99.9% and so on. Such multistep series arrangements are well known in the art. A typical configuration is shown and described in U.S. Pat. No. 4,906,256, FIG. 4 and Column 13, lines 41–64, which are incorporated herein by reference.

The target composition for the unsaturated-hydrocarbon-enriched permeate stream will also vary, depending upon its destination. Again depending on the membrane characteristics and operating conditions, a single-stage membrane unit is typically able to achieve 3-fold, 5-fold or 10-fold enrichment of the unsaturated hydrocarbon concentration of the permeate compared with the feed. If the feed concentration is relatively high, such as a few percent or above, this level of enrichment may be adequate. If further unsaturated hydrocarbon concentration is required, a two-stage or multistage process, in a cascade arrangement where the permeate from the first unit forms the feed to the second, may be used. Such arrangements are again common in the art, and an example of a two-stage design, with optional condensers, may be found in U.S. Pat. No. 4,906,256, FIG. 3 and Column 13, lines 18–41, which are incorporated herein by reference.

Many other membrane system configurations that could be used in membrane-based unsaturated hydrocarbon separation are known. For example, U.S. Pat. No. 5,071,451, incorporated herein by reference in its entirety, describes membrane system designs in which efficiency is improved by attaching an ancillary module or modules on the permeate side of the main membrane unit, but without a full second stage. U.S. Pat. No. 5,256,296, FIG. 5 and Column 8, line 32 to Column 10, line 7, incorporated herein by reference, show and describe a similar design, but without a condenser, in which product concentration is built up in a loop on the permeate side of the main membrane unit. U.S. Pat. No. 5,256,295, FIG. 5 and Column 8, line 26 to Column 10, line 6, incorporated herein by reference, show and describe a two-stage design with ancillary module or modules. The process of the invention is intended to embrace these and any other suitable system configurations.

Most of the description of the process aspects of the invention has focused on separation of unsaturated hydrocarbons from mixtures in the gas phase. As was mentioned above, the scope of the invention also includes processes in which the feed is a liquid mixture, such as pervaporation. In this case, membranes are prepared according to the same guidelines and criteria given above. Those of skill in the art will appreciate that many aspects of process configuration and design as described above for gas separation also apply to pervaporation, and that other teachings with regard to techniques for carrying out pervaporation and other liquid-phase membrane separations are readily available in the literature.

In pervaporation, the feed fluid is liquid and the permeate fluid is in the gas phase. Pervaporation is used industrially to remove water from organic liquids, such as dehydration of alcohols, and is beginning to be used to remove organic compounds from water, such as waste water, process water or groundwater. Much work has also been done at the research level on separation of organic liquids from one another, such as to separate close-boiling liquids or to break azeotropes.

The membranes of the invention are expected to be useful for a number of processes that involve separation of an unsaturated hydrocarbon from a liquid mixture. Representative, non-limiting examples of such separations include benzene/ios-octane separation and hexene/hexane separation.

In yet a third aspect, the invention is the solid polymer solution itself. The solution comprises a polymer solvent and an ionic metal salt solute, all chosen according to the criteria discussed at length above.

The invention is now illustrated by the following examples, which are intended to further clarify understanding of the invention, but are not intended to limit the scope or underlying principles in any way.

EXAMPLES

Example 1

An asymmetric microporous support substrate was prepared by casting onto a non-woven fabric support. A solution containing 16 g of silver tetrafluoroborate, 4 g of poly (ethylene oxide) (PEO) (Mw 900,000, Scientific Polymer Products, Ontario, N.Y.), and 96 g of water was prepared. The solution was coated onto the support substrate, using a continuous dip-coating process. After evaporation of the water, the membranes were dried completely in an oven at 70° C. The resulting solid polymer solution membranes had a selective layer with a silver salt content of 80 wt % and a thickness of about 3 µm.

Samples of membrane were cut into 13 cm$^2$ stamps and mounted in a permeation test-cell apparatus. The permeation of pure, dry ethylene gas was measured at a feed pressure of 50 psig and a permeate pressure of 0 psig, at a feed temperature of 23° C. Volumetric gas flow rates were determined with soap-bubble flowmeters. The test was repeated using pure, dry ethane gas. In this case, the permeate flow rate was too small to be measured with our flowmeters. The pressure-normalized fluxes of ethylene and ethane and the ethylene/ethane selectivity were as listed below:

| | |
|---|---|
| Ethylene pressure-normalized flux: | $1,500 \times 10^{-8}$ cm$^3$/cm$^2$.s.cmHg |
| Ethane pressure-normalized flux: | $<1 \times 10^{-8}$ cm$^3$/cm$^2$.s.cmHg (below lower limit of measurement capabilities) |
| Pure gas ethylene/ethane selectivity: | >1,500 |

Examples 2–5

Membranes made with water-insoluble polymers

Example 2

An asymmetric microporous support substrate was prepared by casting onto a non-woven fabric support. A solution containing 4 g of silver tetrafluoroborate, 1 g of poly(ether ester amide) (Pebax® 2533, Atochem, Philadelphia, Pa.), and 99 g of ethanol was prepared. The solution was coated three times onto the support substrate, using a wick-coating process. After evaporation of the solvent, the membranes were dried completely in an oven at 70° C. The resulting solid polymer solution membranes had a selective layer with a silver salt content of 80 wt % and a thickness of about 3µm. The membrane was overcoated with a solution of 2 wt % poly(dimethylsiloxane) in iso-octane and again dried.

Samples of membrane were cut into 36 cm$^2$ stamps and mounted in a permeation test-cell apparatus. The permeation of pure, dry ethylene gas was measured at a feed pressure of 50 psig and a permeate pressure of 0 psig, at a feed temperature of 23° C. Volumetric gas flow rates were determined with soap-bubble flowmeters. The test was repeated using pure, dry ethane gas. The pressure-normalized fluxes of ethylene and ethane and the ethylene/ethane selectivity were as listed below:

| | |
|---|---|
| Ethylene pressure-normalized flux: | $674 \times 10^{-8}$ cm$^3$/cm$^2$.s.cmHg |
| Ethane pressure-normalized flux: | $17 \times 10^{-8}$ cm$^3$/cm$^2$.s.cmHg |
| Pure gas ethylene/ethane selectivity: | 40 |

Example 3

An asymmetric microporous support substrate was prepared by casting onto a non-woven fabric support. A solution containing 8 g of silver tetrafluoroborate, 2 g of poly (epichlorohydrin) (Herchlor® H, Hercules, Wilmington, Del.), and 98 g of methyl ethyl ketone (MEK) was prepared.

The solution was coated onto the support substrate, using a wick-coating process. After evaporation of the solvent, the membranes were dried completely in an oven at 70° C. The resulting solid polymer solution membranes had a selective layer with a silver salt content of 80 wt % and a thickness of about 3 μm.

Samples of membrane were cut into 13 cm² stamps and mounted in a permeation test-cell apparatus. The permeation of pure, dry ethylene gas was measured at a feed pressure of 50 psig and a permeate pressure of 0 psig, at a feed temperature of 23° C. Volumetric gas flow rates were determined with soap-bubble flowmeters. The test was repeated using pure, dry ethane gas. The pressure-normalized fluxes of ethylene and ethane and the ethylene/ethane selectivity were as listed below:

| | |
|---|---|
| Ethylene pressure-normalized flux: | $2,600 \times 10^{-8}$ cm³/cm².s.cmHg |
| Ethane pressure-normalized flux: | $<1 \times 10^{-8}$ cm³/cm².s.cmHg |
| Pure gas ethylene/ethane selectivity: | >2,600 |

Example 4

An asymmetric microporous support substrate was prepared by casting onto a non-woven fabric support. A solution containing 8 g of silver tetrafluoroborate, 2 g of epichlorohydrin/ethylene oxide copolymer (Herchlor® C, Hercules, Wilmington, Del.), and 98 g of aceonitrile was prepared. The solution was coated onto the support substrate, using a wick-coating process. After evaporation of the solvent, the membranes were dried completely in an oven at 70° C. The resulting solid polymer solution membranes had a selective layer with a silver salt content of 80 wt % and a thickness of about 3 μm.

Samples of membrane were cut into 36 cm² stamps and mounted in a permeation test-cell apparatus. The permeation of pure, dry ethylene gas was measured at a feed pressure of 50 psig and a permeate pressure of 0 psig, at a feed temperature of 23° C. Volumetric gas flow rates were determined with soap-bubble flowmeters. The test was repeated using pure, dry ethane gas. The pressure-normalized fluxes of ethylene and ethane and the ethylene/ethane selectivity were as listed below:

| | |
|---|---|
| Ethylene pressure-normalized flux: | $11,000 \times 10^{-8}$ cm³/cm².s.cmHg |
| Ethane pressure-normalized flux: | $<1 \times 10^{-8}$ cm³/cm².s.cmHg |
| Pure gas ethylene/ethane selectivity: | >11,000 |

Example 5

An asymmetric microporous support substrate was prepared by casting onto a non-woven fabric support. A solution containing 8 g of silver tetrafluoroborate, 2 g of propylene oxide/allylglycidylether copolymer (Parel®58, Hercules, Wilmington, Del.), and 98 g of ethanol was prepared. The solution was coated onto the support substrate, using a wick-coating process. After evaporation of the solvent, the membranes were dried completely in an oven at 70° C. The resulting membranes had a selective layer with a silver salt content of 80 wt %.

Samples of membrane were cut into 36 cm² stamps and mounted in a permeation test-cell apparatus. The permeation of pure, dry ethylene gas was measured at a feed pressure of 50 psig and a permeate pressure of 0 psig, at a feed temperature of 23° C. Volumetric gas flow rates were determined with soap-bubble flowmeters. The test was repeated using pure, dry ethane gas. The pressure-normalized fluxes of ethylene and ethane and the ethylene/ethane selectivity were as listed below:

| | |
|---|---|
| Ethylene presure-normalized flux: | $3,200 \times 10^{-8}$ cm³/cm².s.cmHg |
| Ethane pressure-normalized flux: | $<1 \times 10^{-8}$ cm³/cm².s.cmHg |
| Pure gas ethylene/ethane selectivity: | >3,200 |

Example 6

Effect of salt concentration

Membranes were prepared as in Example 1, using different loadings of salt in aqueous 4 wt % PEO solutions to prepare the pre-solution and depositing the selective layer on the support substrate by dip-coating. The permeation properties of the resulting membranes were tested with dry, pure ethylene, propylene, ethane and propane, using the general test procedure described above, differing only in that the feed pressure was 100 psig. The results are shown in Table 3.

TABLE 3

| AgBF₄ content in membrane | | Pressure-normalized pure-gas flux $\times 10^8$ (cm³/cm² · s · cmHg) | | | | Pure-gas selectivity (—) | |
|---|---|---|---|---|---|---|---|
| Wt % | Et. oxide:Ag mole ratio (—) | $C_2H_6$ | $C_3H_8$ | $C_2H_4$ | $C_3H_6$ | $C_2H_4/C_2H_6$ | $C_3H_6/C_3H_8$ |
| 0* | — | 46 | 36 | 55 | 89 | 1.2 | 2.5 |
| 33 | 8 | 9.5 | 11 | 18 | 22 | 1.9 | 2 |
| 50 | 4 | <1** | <1** | 160 | 260 | >160 | >260 |
| 67 | 2 | <1** | <1** | 1,000 | 1,000 | >1,000 | >1,000 |
| 80 | 1 | 2.3 | 1.2 | ~5,500 | ~4,800 | ~2,400 | ~4,000 |

*Membrane composed of pure PEO.
**Gas flow rate too small to be measured.

Pure poly(ethylene oxide) composite membranes exhibit extremely poor performance for olefin/saturated hydrocarbon separation. The ethylene/ethane and propylene/propane selectivities are 1.2 and 2.5, respectively. The membrane with only 33 wt % silver salt also displays poor gas separation properties. As shown in Table 3, the fluxes of both the olefin and the saturated hydrocarbons are three- to five-fold lower than those of a pure PEO membrane, and the olefin/saturated hydrocarbon selectivity of 2 is as low as that of the polymer membrane. The decrease in fluxes and unimproved selectivity indicate that a 33 wt % salt concentration is too low to facilitate olefin transport.

When the salt concentration exceeds 33 wt %, the facilitation effect of the silver ions begins to be seen. The olefin flux increases with increasing silver salt concentration. The pure ethylene and propylene fluxes through a membrane with 80 wt % silver salt are 50–100 times higher than those through a pure PEO membrane. Moreover, the fluxes of the saturated hydrocarbons, ethane and propane, are 20 times lower in the membrane with 80 wt % carrier than in the polymer membrane. As a result, the pure-gas olefin/saturated hydrocarbon selectivity increases substantially at higher silver salt concentrations. Pure-gas ethylene/ethane and propylene/propane selectivities of a membrane with 80 wt % $AgBF_4$ were 2,400 and 4,000, respectively.

The pure-gas permeation experiments were performed with dry gases, indicating that the silver ions are mobile in the solid polymer solution.

Example 7

Membranes were prepared as in Example 6 and tested with a dry gas mixture containing 50 vol % each ethylene and ethane, at a feed pressure of 100 psig. The results are shown in Table 4.

TABLE 4

| $AgBF_4$ content in membrane | | Permeate concentration (vol %) | | Pressure-normalized mixed-gas flux × $10^8$ ($cm^3/cm^2 \cdot s \cdot cmHg$) | | Mixed-gas $C_2H_4/C_2H_6$ selectivity |
|---|---|---|---|---|---|---|
| Wt % | Ethylene oxide:Ag mole ratio (−) | $C_2H_6$ | $C_2H_4$ | $C_2H_6$ | $C_2H_4$ | (−) |
| 50 | 4 | 7.9 | 92.1 | 5.7 | 85 | 15 |
| 67 | 2 | 1.6 | 98.4 | 2.9 | 230 | 79 |
| 80 | 1 | 1.1 | 98.9 | 3.2 | 370 | 120 |

Raising the salt concentration from 50 to 80 wt % increases the permeate ethylene concentration from 92 to almost 99%, and the mixed-gas ethylene/ethane selectivity increases by eight-fold, from 15 to 120.

Figure 2:
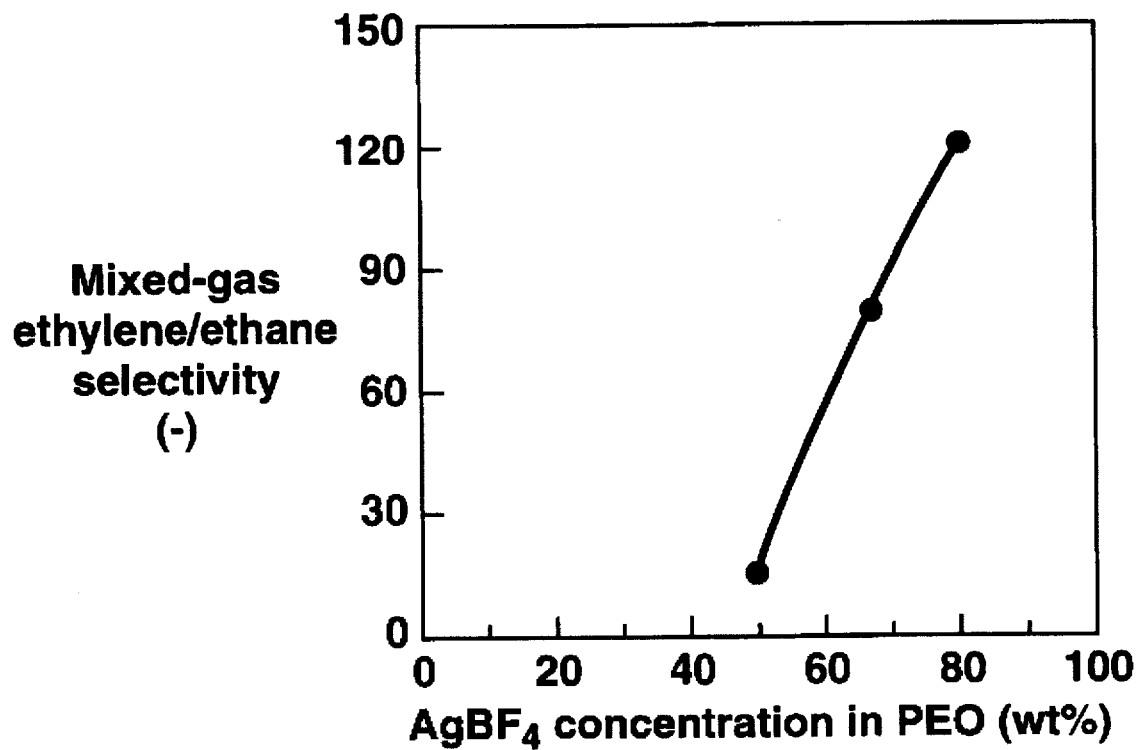
FIG. 2 is a graph of mixed gas ethylene/ethane selectivity as a function of salt concentration in the solid polymer solution.

The results are plotted graphically in FIGS. 1 and 2. The selectivity of the membranes was lower with gas mixtures than with pure gases, because of increased ethane flux due to co-permeation of ethylene. The properties again show a strong dependence on silver-salt content.

Example 8

Higher salt loading

A membrane was prepared from PO/AGE copolymer and silver tetrafluoroborate salt as in Example 5, except that the wt % ratios of polymer and salt concentration in the pre-solution were 10 wt % polymer and 90 wt % salt. The membranes were tested with pure, dry gases as in Example 5. The results were as follows:

| | |
|---|---|
| Ethylene pressure-normalized flux: | 2.2 × $10^{-4}$ ($cm^3/cm^2 \cdot s \cdot cmHg$) |
| Ethane pressure-normalized flux: | <1 × $10^{-8}$ ($cm^3/cm^2 \cdot s \cdot cmHg$) |
| Pure gas ethylene/ethane selectivity: | >22,000 |

Example 9

Pressure Stability

Membranes were prepared from PEO and silver tetrafluoroborate by the same techniques as in Example 1. The finished membrane had a selective layer with a silver salt content of 67 wt % and a thickness of about 3 μm. The permeation properties of the resulting membranes were tested with dry, pure ethylene, propylene, ethane and propane, using the general test procedure described above, at numerous feed pressures in the range 25–500 psig, always maintaining the permeate side of the cell at 0 psig. Representative results are shown in Table 5.

TABLE 5

| Gas | Feed pressure (psig) | Pressure-normalized pure-gas flux × $10^8$ ($cm^3/cm^2.s.cmHg$) |
|---|---|---|
| $C_2H_6$ | 50 | <1** |
|  | 100 | <1** |
|  | 500 | <1** |
| $C_3H_8$ | 50 | <1* |
|  | 100 | <1** |
| $C_2H_4$ | 50 | 1500 |
|  | 100 | 1000 |
|  | 500 | 430 |
| $C_3H_6$ | 50 | 1300 |
|  | 100 | 1000 |

**Gas flow too small to be measured

No dramatic increases in paraffin (ethane and propane) pressure-normalized fluxes were observed at higher feed pressures. This indicates that the membranes were mechanically stable at least up to 500 psig. The olefin pressure-normalized fluxes decrease with increasing feed pressure, because olefin transport is controlled by the complexation reaction of the olefins with the silver ions. Once all available silver ions are complexed, a higher olefin pressure does not increase olefin transport.

Example 10

Membranes were prepared as in Example 9 and tested with a dry gas mixture containing 50 vol % each ethylene and ethane, at feed pressures of 50 psig and 100 psig. The results are shown in Table 6.

TABLE 6

| Feed pressure (psig) | Permeate concentration (vol %) | | Pressure-normalized mixed-gas flux × $10^8$ ($cm^3/cm^2 \cdot s \cdot cmHg$) | | Mixed-gas $C_2H_4/C_2H_6$ selectivity |
|---|---|---|---|---|---|
|  | $C_2H_6$ | $C_2H_4$ | $C_2H_6$ | $C_2H_4$ | (−) |
| 50 | 0.7 | 99.3 | 3.3 | 790 | 240 |
| 100 | 1.1 | 98.9 | 3.2 | 370 | 120 |

Raising the feed pressure lowers the ethylene/ethane selectivity from 240 to 120. This reduction is caused by a decline in ethylene pressure-normalized flux, caused by carrier saturation, and a rise in ethane flux, probably caused by increased solubility in the polymer.

Although selectivity and flux decrease with increasing feed pressure, they are still within useful values, even at 100 psig and above. The permeate ethylene concentration is relatively insensitive to feed pressure and remains at about 99% over the pressure range.

Example 11

Long-term permeation tests

Membranes were prepared from PEO as in Example 1 and from PO/AGE as in Example 5. For each membrane, long-term ethylene permeation tests were conducted according to the procedures described above for 20 days.

The ethylene pressure-normalized flux of membranes made from the amorphous, rubbery PO/AGE decreased from $3.2 \times 10^{-5}$ cm$^3$(STP)/cm$^2$·s·cmHg to $4.7 \times 10^{-6}$ cm$^3$(STP)/cm$^2$·s·cmHg over the twenty-day period.

The ethylene pressure-normalized flux of the semi-crystalline PEO membranes dropped more sharply, from $2.5 \times 10^{-5}$ cm$^3$(STP)/cm$^2$·s·cmHg initially to $9.2 \times 10^{-7}$ cm$^3$(STP)/cm$^2$·s·cmHg at the end of the test.

Example 12

Mixed gas stability tests

PO/AGE membranes were prepared as in Example 5. The mixed gas permeation properties were measured with a dry mixture of 50% ethylene/50% ethane according to the procedures described above. The results were as follows:

| | |
|---|---|
| Pressure-normalized ethylene flux: | $300 \times 10^{-7}$ cm$^3$(STP)/cm$^2$.s.cmHg |
| Pressure-normalized ethane flux: | $2.1 \times 10^{-7}$ cm$^3$(STP)/cm$^2$.s.cmHg |
| Selectivity: | 140. |

The same membrane was subjected to a 40-day permeation test with a dry mixture of 70 vol % ethylene, 30 vol % ethane at a feed pressure of 50 psig and a permeate pressure of 0 psig. The results are shown graphically in FIGS. 3 and 4.

Figure 3:
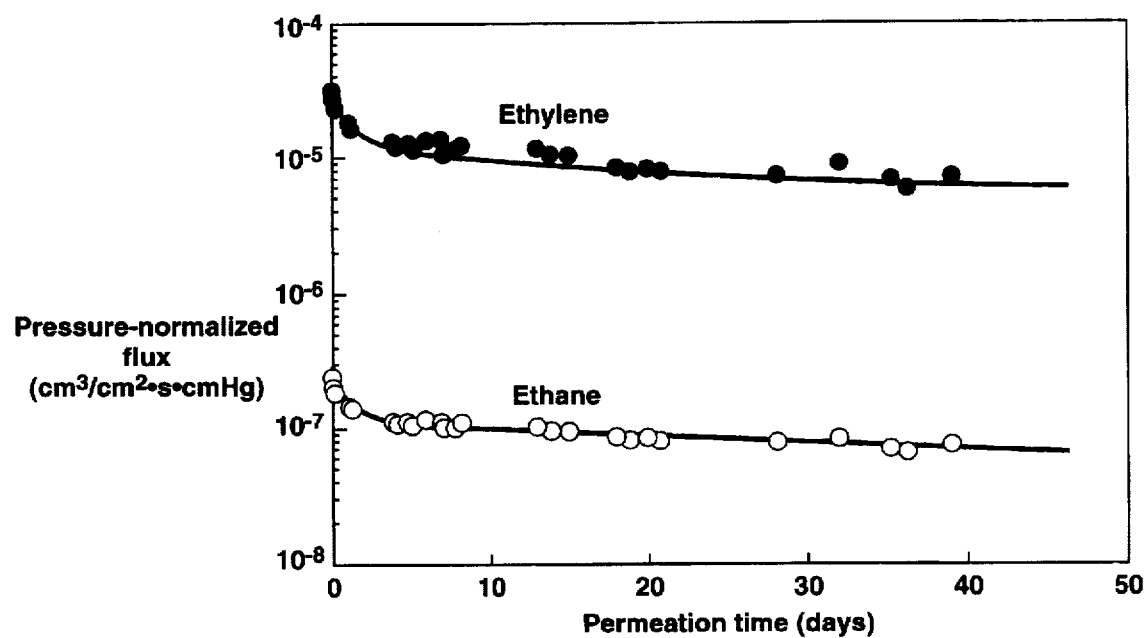
FIG. 3 is a graph of pressure-normalized mixed gas ethylene and ethane fluxes measured over a 40-day test period.

As can be seen from FIG. 3, the ethylene pressure-normalized flux decreased from about $3 \times 10^{-5}$ cm$^3$(STP)/cm$^2$·s·cmHg to $8 \times 10^{-6}$ cm$^3$(STP)/cm$^2$·s·cmHg during the first 20 days of operation, but remained essentially stable thereafter. The ethane pressure-normalized flux decreased from $2.1 \times 10^{-7}$ cm$^3$(STP)/cm$^2$·s·cmHg to about $8 \times 10^{-8}$ cm$^3$(STP)/cm$^2$·s·cmHg over the course of the test. We believe that the decrease in flux for both components indicates that a small amount of the silver salt may precipitate out of the polymer solution during exposure to the test gas mixture.

The selectivity over the duration of the test dropped from 140 initially to 100 after 20 days and remained at about 100 thereafter. The ethylene concentration in the permeate dropped from 99.4% to 98.7%. These results indicate that the membrane was functional at useful performance levels throughout the 40-day test.

Example 13

Membranes were prepared from PEO and silver tetrafluoroborate by the same techniques as in Example 1. The finished membranes had a selective layer with a silver salt content of 80 wt % and a thickness of about 3 µm. The permeation properties of the resulting membranes were tested with a dry feed gas mixture containing 50 vol % each propylene and propane, using the general test procedures described above, at feed pressures of 20, 35 and 50 psig and permeate pressure of 0 psig. The results are given in Table 7.

TABLE 7

| Feed pressure | Permeate concentration (vol %) | | Pressure-normalized mixed-gas flux × 10$^8$ (cm$^3$/cm$^2$ · s · cmHg) | | Mixed-gas C$_3$H$_6$/C$_3$H$_8$ selectivity |
|---|---|---|---|---|---|
| (psig) | C$_3$H$_8$ | C$_3$H$_6$ | C$_3$H$_8$ | C$_3$H$_6$ | (—) |
| 20 | 7.7 | 92.3 | 99 | 5,600 | 57 |
| 35 | 4.3 | 95.7 | 76 | 3,900 | 51 |
| 50 | 3.9 | 96.1 | 110 | 4,900 | 45 |

Comparative Examples 14–18 (not in accordance with the invention)

Example 14 PVA/silver nitrate membranes

A membrane was prepared according to the teachings of U.S. Pat. No. 5,015,268, Example 1, using equal weights of polyvinyl alcohol (PVA) and silver nitrate. The concentration of polymer in the membrane coating solution was 3 wt %. The membranes were dried and overcoated with a 1 wt % solution of polydimethylsiloxane. Permeation tests were carried out according to the method described in our Example 1 above with dry, pure ethylene gas at a feed pressure of 50 psig, a permeate pressure of 0 psig and a temperature of 24° C. The experiment was repeated with ethane gas. Gas flows were so low for both gases that an accurate measurement could not be obtained with our flowmeters. In both cases, the pressure-normalized flux was below $1 \times 10^{-8}$ cm$^3$(STP)/cm$^2$·s·cmHg.

The membrane was retested with water-vapor-saturated ethylene obtained by passing the incoming gas through a water bubbler upstream of the permeation cell. Measurements were again taken at 24° C., 50 psig feed pressure and 0 psig permeate pressure. Under these conditions, the membrane exhibited a pressure-normalized ethylene flux of $1.5 \times 10^{-5}$ cm$^3$(STP)/cm$^2$·s·cmHg. This result shows that PVA/silver nitrate membranes show facilitated olefin transport in a water-wet environment, but not in a water-dry environment.

Example 15 Nafion®/silver nitrate membranes

Nafion 117 was mixed with silver nitrate to obtain a membrane coating solution containing equal weights of polymer and salt. The polymer concentration of the coating solution was 3 wt %. Composite membranes were prepared according to the procedures of Example 1. The resulting membranes were dried and overcoated with a 1 wt % solution of polydimethylsiloxane. Permeation tests were carried out according to the method described in Example 1 with dry, pure ethylene gas at a feed pressure of 50 psig, a permeate pressure of 0 psig and a temperature of 24° C. The experiment was repeated with ethane gas. The results were as follows:

| | |
|---|---|
| Ethylene pressure-normalized flux: | $7.9 \times 10^{-7}$ cm$^3$/cm$^2$.s.cmHg |
| Ethane pressure-normalized flux: | $4.8 \times 10^{-7}$ cm$^3$/cm$^2$.s.cmHg |
| Pure gas ethylene/ethane selectivity: | 1.6 |

The membrane was retested with water-vapor-saturated ethylene obtained by passing the incoming gas through a water bubbler upstream of the permeation cell. Measurements were again taken at 24° C., 50 psig feed pressure and 0 psig permeate pressure. Under these conditions, the membrane exhibited a pressure-normalized ethylene flux of $2.4 \times$ $10^{-5}$ cm$^3$(STP)/cm$^2$·s·cmHg. This result shows that Nafion/silver nitrate membranes show facilitated olefin transport in a water-wet environment, but not in a water-dry environment.

Example 16 PEO/silver triflate membranes

Composite membranes were prepared according to the general procedure of Example 1, using equal weights of PEO and silver triflate (AgCF$_3$SO$_3$). The concentration of polymer in the aqueous coating solution was 4 wt %.

The membranes were tested according to the method described in Example 1 at 24° C. with dry, pure ethylene gas at a feed pressure of 50 psig and a permeate pressure of 0 psig. The experiment was repeated with ethane gas. The results were as follows:

| | |
|---|---|
| Ethylene pressure-normalized flux: | 2.9 × 10$^{-7}$ cm$^3$/cm$^2$.s.cmHg |
| Ethane pressure-normalized flux: | 2.7 × 10$^{-7}$ cm$^3$/cm$^2$.s.cmHg |

The membrane exhibited essentially no selectivity for ethylene.

The tests were repeated with propylene and propane. The results were as follows:

| | |
|---|---|
| Propylene pressure-normalized flux: | 1.4 × 10$^{-7}$ cm$^3$/cm$^2$.s.cmHg |
| Propane pressure-normalized flux: | <1 × 10$^{-8}$ cm$^3$/cm$^2$.s.cmHg |
| Pure gas propylene/propane selectivity: | >14. |

Example 17 PEO/silver hexafluoroantimonate membranes

Composite membranes were prepared according to the general procedure of Example 1, using weight proportions of one part PEO to two parts silver hexafluoroantimonate (AgSbF$_6$). The concentration of polymer in the aqueous coating solution was 4 wt %.

The membranes were tested according to the method described in Example 1 at 24° C. with dry, pure ethylene gas at a feed pressure of 50 psig and a permeate pressure of 0 psig. The experiment was repeated with ethane gas. The results were as follows:

| | |
|---|---|
| Ethylene pressure-normalized flux: | 9.4 × 10$^{-8}$ cm$^3$/cm$^2$.s.cmHg |
| Ethane pressure-normalized flux: | <1 × 10$^{-8}$ cm$^3$/cm$^2$.s.cmHg |

Again, the membrane exhibited little selectivity.

Example 18 PEO/silver nitrate

Composite membranes were prepared according to the general procedure of Example 1, using weight proportions of one part PEO to two parts silver nitrate. The concentration of polymer in the aqueous coating solution was 4 wt %.

The membranes were tested according to the method described in Example 1 at 24° C. with dry, pure ethylene gas at a feed pressure of 50 psig and a permeate pressure of 0 psig. The experiment was repeated with ethane gas. The results were as follows:

| | |
|---|---|
| Ethylene pressure-normalized flux: | 1.7 × 10$^{-6}$ cm$^3$/cm$^2$.s.cmHg |
| Ethane pressure-normalized flux: | 1.7 × 10$^{-6}$ cm$^3$/cm$^2$.s.cmHg |

The membrane showed no selectivity in favor of ethylene.

We claim:

1. A separation membrane, comprising a solid solution of an ionic metal salt in a polymer, said membrane being characterized by a selectivity for an unsaturated hydrocarbon over a saturated hydrocarbon having the same number of carbon atoms of at least about 20, and a pressure-normalized flux of said unsaturated hydrocarbon of at least about 5×10$^{-6}$ cm$^3$(STP)/cm$^2$·s·cmHg, said flux and selectivity being measured with a gas mixture containing said unsaturated and saturated hydrocarbons, and in a substantially dry environment.

2. The membrane of claim 1, wherein said polymer has a predominantly amorphous structure at 25° C.

3. The membrane of claim 1, wherein said polymer is predominantly rubbery at 25° C.

4. The membrane of claim 1, wherein said polymer is insoluble in water.

5. The membrane of claim 1, wherein said polymer is uncrosslinked.

6. The membrane of claim 1, wherein said polymer contains an oxygen heteroatom.

7. The membrane of claim 1, wherein said polymer contains an ether linkage.

8. The membrane of claim 1, wherein said polymer comprises an alkyl oxide repeating unit.

9. The membrane of claim 1, wherein said polymer comprises a copolymer.

10. The membrane of claim 1, wherein said polymer is chosen from the group consisting of poly(epichlorohydrin), polyether-polyamide block copolymers, epichlorohydrin/ethylene oxide copolymers, poly(ethylene oxide) and propylene oxide/allylglycidylether copolymers.

11. The membrane of claim 1, wherein said ionic metal salt contains a metal ion that has an ionic radius greater than about 0.07 nm and a softness parameter that is a positive number.

12. The membrane of claim 11, wherein said metal ion is chosen from the group consisting of silver and copper.

13. The membrane of claim 1, wherein said ionic metal salt contains a salt ion that has an ionic radius greater than about 0.15 nm and a softness parameter greater than about +0.2.

14. The membrane of claim 13, wherein said salt ion is chosen from the group consisting of tetrafluoroborate, cyanide, thiocyanide and tetraphenylborate.

15. The membrane of claim 1, wherein ionic metal salt is silver tetrafluoroborate.

16. The membrane of claim 1, wherein the weight percentage of said ionic metal salt in said polymer is at least about 50 wt %.

17. The membrane of claim 1, wherein the weight percentage of said ionic metal salt in said polymer is at least about 80 wt %.

18. The membrane of claim 1, wherein said membrane is a composite membrane.

19. The membrane of claim 1, wherein said selectivity is at least about 50.

20. The membrane of claim 1, wherein said pressure-normalized flux is at least about 1×10$^{-5}$ cm$^3$(STP)/cm$^2$·s·cmHg.

21. A process for separating an unsaturated hydrocarbon from a feed fluid mixture, comprising the following steps:

(a) providing a membrane having a feed side and a permeate side, said membrane comprising a solid solution of an ionic metal salt in a polymer and characterized by a selectivity for ethylene over ethane of at least about 20, and a pressure-normalized ethylene flux of at least about $5 \times 10^{-6}$ cm$^3$(STP)/cm$^2 \cdot$s$\cdot$cmHg, said flux and selectivity being measured with a gas mixture containing ethylene and ethane, and in a substantially dry environment;

(b) providing a driving force for transmembrane permeation;

(c) passing said feed fluid mixture across said feed side; and (d) withdrawing from said permeate side a permeate fluid mixture enriched in said unsaturated hydrocarbon compared with said feed mixture.

22. The process of claim 21, wherein said polymer is rubbery and insoluble in water.

23. The process of claim 21, wherein said polymer comprises an alkyl oxide repeating unit.

24. The process of claim 21, wherein said ionic metal salt is silver tetrafluoroborate.

25. The process of claim 21, wherein said feed fluid and said permeate fluid are both in the gas phase.

26. The process of claim 21, wherein said unsaturated hydrocarbon contains a carbon-carbon double bond.

27. The process of claim 21, wherein said unsaturated hydrocarbon is an aromatic hydrocarbon.

28. The process of claim 21, wherein said unsaturated hydrocarbon contains a carbon-carbon triple bond.

29. The process of claim 21, wherein said unsaturated hydrocarbon is ethylene.

30. The process of claim 21, wherein said unsaturated hydrocarbon is propylene.

31. The process of claim 21, wherein said feed fluid mixture contains ethane.

32. The process of claim 21, wherein said feed fluid mixture contains propane.

33. The process of claim 21, wherein said process is pervaporation, that is, said feed fluid is liquid and said permeate fluid is in the gas phase.

34. A process for separating ethylene from ethane in a feed gas mixture containing both, comprising the following steps:

(a) providing a membrane having a feed side and a permeate side, said membrane comprising a solid solution of an ionic metal salt in a polymer and characterized by a selectivity for ethylene over ethane of at least about 20, and a pressure-normalized ethylene flux of at least about $5 \times 10^{-6}$ cm$^3$(STP)/cm$^2 \cdot$s$\cdot$cmHg, said flux and selectivity being measured with a gas mixture containing ethylene and ethane, and in a substantially dry environment;

(b) providing a driving force for transmembrane permeation;

(c) passing said feed fluid mixture across said feed side; and (d) withdrawing a second gas mixture enriched in ethylene compared with said feed gas mixture from said permeate side.

35. A process for separating propylene from propane in a feed gas mixture containing both, comprising the following steps:

(a) providing a membrane having a feed side and a permeate side, said membrane comprising a solid solution of an ionic metal salt in a polymer and characterized by a selectivity for ethylene over ethane of at least about 20, and a pressure-normalized ethylene flux of at least about $5 \times 10^{-6}$ cm$^3$(STP)/cm$^2 \cdot$s$\cdot$cmHg, said flux and selectivity being measured with a gas mixture containing ethylene and ethane, and in a substantially dry environment;

(b) providing a driving force for transmembrane permeation;

(c) passing said feed fluid mixture across said feed side; and (d) withdrawing a second gas mixture enriched in propylene compared with said feed gas mixture from said permeate side.

* * * * *